(12) United States Patent
DeLuca et al.

(10) Patent No.: US 9,215,153 B2
(45) Date of Patent: Dec. 15, 2015

(54) PROVIDING STATUS INFORMATION FOR VIRTUAL RESOURCE COMPUTING ENVIRONMENT

(75) Inventors: Lisa Seacat DeLuca, San Francisco, CA (US); Albert DeLucca, Wantagh, NY (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/252,736

(22) Filed: Oct. 4, 2011

(65) Prior Publication Data

US 2013/0132556 A1   May 23, 2013

(51) Int. Cl.
*G06F 11/30* (2006.01)
*G06F 11/32* (2006.01)
*H04L 12/26* (2006.01)

(52) U.S. Cl.
CPC ............ *H04L 43/08* (2013.01); *G06F 11/3006* (2013.01); *G06F 11/3055* (2013.01); *G06F 11/3086* (2013.01); *G06F 11/328* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 5,621,912 A | 4/1997 | Borruso et al. | |
| 7,278,142 B2 * | 10/2007 | Bandhole et al. | 718/104 |
| 7,496,920 B1 * | 2/2009 | Bandhole et al. | 718/104 |
| 7,644,312 B2 | 1/2010 | Hind et al. | |
| 7,886,294 B2 | 2/2011 | Dostert et al. | |
| 7,987,262 B2 | 7/2011 | Tung et al. | |
| 8,108,855 B2 * | 1/2012 | Dias et al. | 717/177 |
| 8,370,802 B2 * | 2/2013 | Pacifici et al. | 717/120 |
| 8,434,093 B2 * | 4/2013 | Larimore et al. | 719/312 |
| 8,468,175 B2 * | 6/2013 | Obata | 707/802 |
| 8,498,997 B2 * | 7/2013 | Murase | 707/764 |
| 2007/0294676 A1 * | 12/2007 | Mellor et al. | 717/139 |
| 2008/0163194 A1 * | 7/2008 | Dias et al. | 717/174 |
| 2009/0007105 A1 * | 1/2009 | Fries et al. | 718/1 |
| 2009/0077090 A1 * | 3/2009 | Pacifici et al. | 707/10 |
| 2009/0300076 A1 * | 12/2009 | Friedman et al. | 707/203 |
| 2010/0128432 A1 * | 5/2010 | Miller | 361/679.54 |
| 2010/0256795 A1 | 10/2010 | McLaughlin et al. | |
| 2011/0004676 A1 * | 1/2011 | Kawato | 709/221 |
| 2011/0099146 A1 | 4/2011 | McAlister et al. | |
| 2011/0107330 A1 * | 5/2011 | Freundlich et al. | 718/1 |
| 2011/0131499 A1 | 6/2011 | Ferris et al. | |
| 2011/0246984 A1 * | 10/2011 | Sharp et al. | 718/1 |
| 2012/0151477 A1 * | 6/2012 | Sinha et al. | 718/1 |

(Continued)

OTHER PUBLICATIONS

"IBM Tivoli Monitoring", copyright IBM Corporation 2009, 6 pages. No authors cited. ftp.software.ibm.com.

(Continued)

*Primary Examiner* — Ninos Donabed
(74) *Attorney, Agent, or Firm* — Noah A. Sharkan; Hunter E. Webb; Keohane & D'Alessandro PLLC

(57) ABSTRACT

Embodiments of the present invention provide an approach for an image provider to specify data (e.g., commands to run, files to read), etc., about an image of a virtual resource (e.g., virtual machine, etc.) in a networked computing environment (e.g., a cloud computing environment). Such data may be used (e.g., at runtime) by a client application to obtain specific information about a running instance that is provisioned based on the image (e.g., operating system health, middleware health, etc.).

19 Claims, 8 Drawing Sheets

(56) References Cited

U.S. PATENT DOCUMENTS

2012/0240116 A1* 9/2012 Leung et al. .................... 718/1
2013/0290543 A1* 10/2013 Lochhead et al. ............ 709/226

OTHER PUBLICATIONS

Maitland, J., "Keeping Control Isn't Easy", Chapter 4: Cloud-Based Infrastructure, SearchCloudComputing.cdom, 13 pages.

Mell et al., "The NIST Definition of Cloud Computing", National Institute of Standards and Technology, Information Technology Laboratory, Version 15, Oct. 7, 2009, 2 pages.

Amies, a. et at., "Monitor services in the cloud", Feb. 16, 2011, 21 pages. http://www.ibm.com/developerworks/cloud/library/cl-monitorcloudservices . . . .

Maitland, J., "Keeping Control Isn't Easy", Chapter 4: Cloud-Based Infrastructure, SearchCloudComputing.com, Publication Date: Oct. 2009, 19 pages.

* cited by examiner

PROVIDING STATUS INFORMATION FOR VIRTUAL RESOURCE COMPUTING ENVIRONMENT

TECHNICAL FIELD

In general, embodiments of the present invention relate to virtual resource images. Specifically, embodiments of the present invention relate to an approach for providing status information for virtual resource images in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In current server management systems, hypervisors may create running instances of resource (e.g., server) images and provide messages that describe system events, such as provisioning status, operating system status (e.g., operational or rebooting), etc. Challenges may exist in that these systems may not provide visibility into user level states such as the status of installed software. As such, tools that receive messages about the state of associated network resources may have insufficient access to information about the overall health of their virtual assets, which may include (among other things) hardware, software, and/or network status.

SUMMARY

Embodiments of the present invention provide an approach for an image provider to specify data (e.g., commands to run, files to read), etc., about an image of a virtual resource (e.g., virtual machine, etc.) in a networked computing environment (e.g., a cloud computing environment). Such data may be used (e.g., at runtime) by a client application to obtain specific information about a running instance that is provisioned based on the image (e.g., operating system health, middleware health, etc.). In a typical embodiment, an image of a virtual resource is associated with a template (e.g., comprising data that provides/yields a status of the image). The template and the image are then stored in a catalog (e.g., on a computer storage medium in the networked computing environment). When a request for an instance of the virtual resource is received (e.g., based upon selection of the image from the catalog), the instance will be provisioned based on the image from the catalog. Then, the instance and the template will be made available to the requester. An application or the like on a client device on which the instance is loaded can then utilize the template (i.e., by executing the commands, files, etc. set forth therein) to obtain corresponding status information for the instance.

A first aspect of the present invention provides a computer-implemented method for providing status information for virtual resource images in a networked computing environment, comprising: associating a template with an image of a virtual resource, the template comprising information used to determine a status of the image; storing the template and the image in a catalog on a computer storage medium in the networked computing environment; receiving a request for an instance of the virtual resource; provisioning the instance based on the image; and providing the template with the instance.

A second aspect of the present invention provides a system for providing status information for virtual resource images in a networked computing environment, comprising: a memory medium comprising instructions; a bus coupled to the memory medium; and a processor coupled to the bus that when executing the instructions causes the system to: associate a template with an image of a virtual resource, the template comprising information used to determine a status of the image; store the template and the image in a catalog on a computer storage medium in the networked computing environment; receive a request for an instance of the virtual resource; provision the instance based on the image; and provide the template with the instance.

A third aspect of the present invention provides a computer program product for providing status information for virtual resource images in a networked computing environment, the computer program product comprising a computer readable storage media, and program instructions stored on the computer readable storage media, to: associate a template with an image of a virtual resource, the template comprising information used to determine a status of the image; store the template and the image in a catalog on a computer storage medium in the networked computing environment; receive a request for an instance of the virtual resource; provision the instance based on the image; and provide the template with the instance.

A fourth aspect of the present invention provides a method for deploying a system for providing status information for virtual resource images in a networked computing environment, comprising: providing a computer infrastructure being operable to: associate a template with an image of a virtual resource, the template comprising information used to determine a status of the image; store the template and the image in a catalog on a computer storage medium in the networked computing environment; receive a request for an instance of the virtual resource; provision the instance based on the image; and provide the template with the instance.

BRIEF DESCRIPTION OF THE DRAWINGS

These and other features of this invention will be more readily understood from the following detailed description of the various aspects of the invention taken in conjunction with the accompanying drawings in which.

Figure 1:
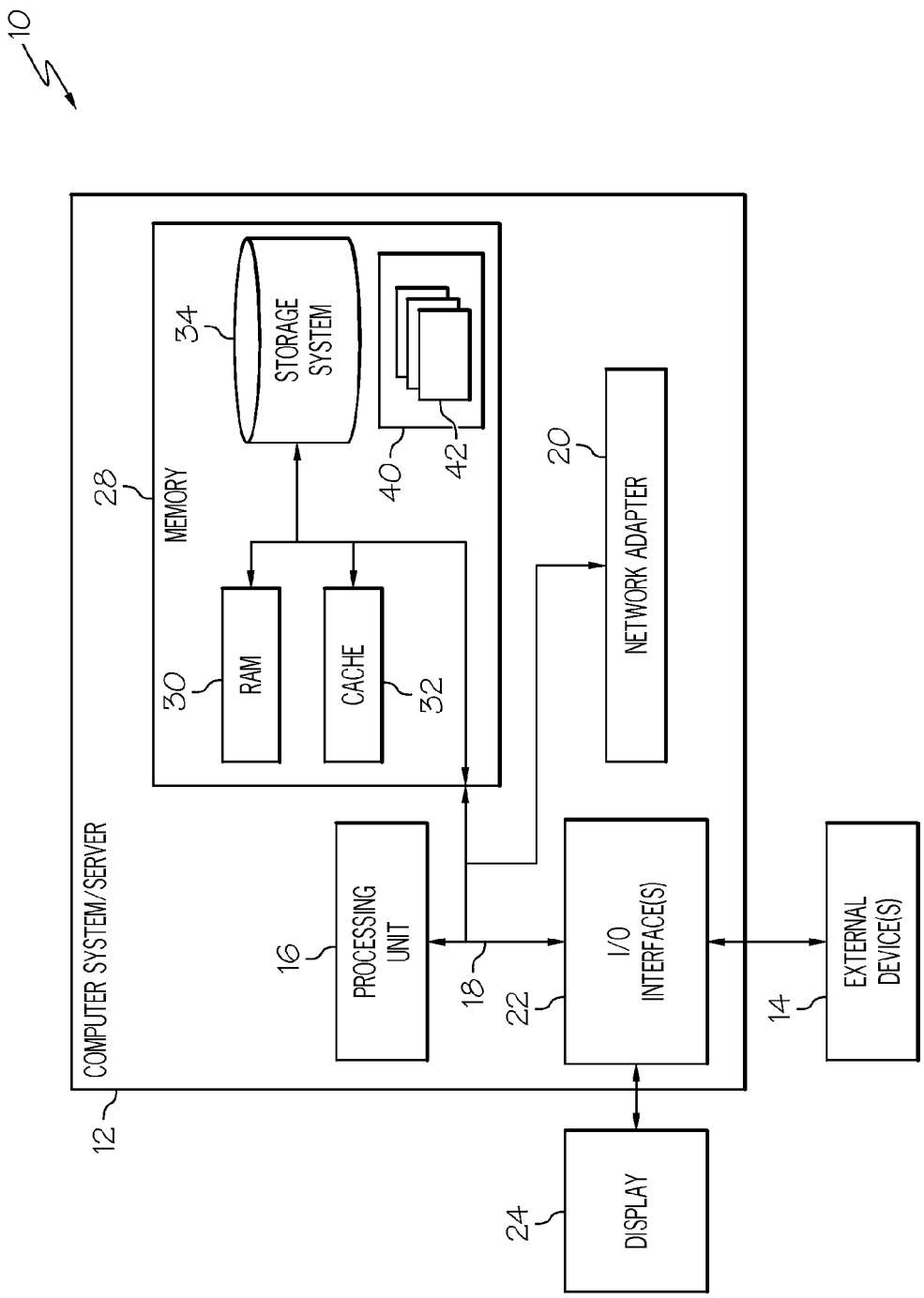
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for an image provider to specify data (e.g., commands to run, files to read), etc., about an image of a virtual resource (e.g., virtual machine, etc.) in a networked computing environment (e.g., a cloud computing environment). Such data may be used (e.g., at runtime) by a client application to obtain specific information about a running instance that is provisioned based on the image (e.g., operating system health, middleware health, etc.). In a typical embodiment, an image of a virtual resource is associated with a template (e.g., comprising data that provides/yields a status of the image). The template and the image are then stored in a catalog (e.g., on a computer storage medium in the networked computing environment). When a request for an instance of the virtual resource is received (e.g., based upon selection of the image from the catalog), the instance will be provisioned based on the image from the catalog. Then, the instance and the template will be made available to the requester. An application or the like on a client device on which the instance is loaded can then utilize the template (i.e., by executing the commands, files, etc. set forth therein) to obtain corresponding status information for the instance.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
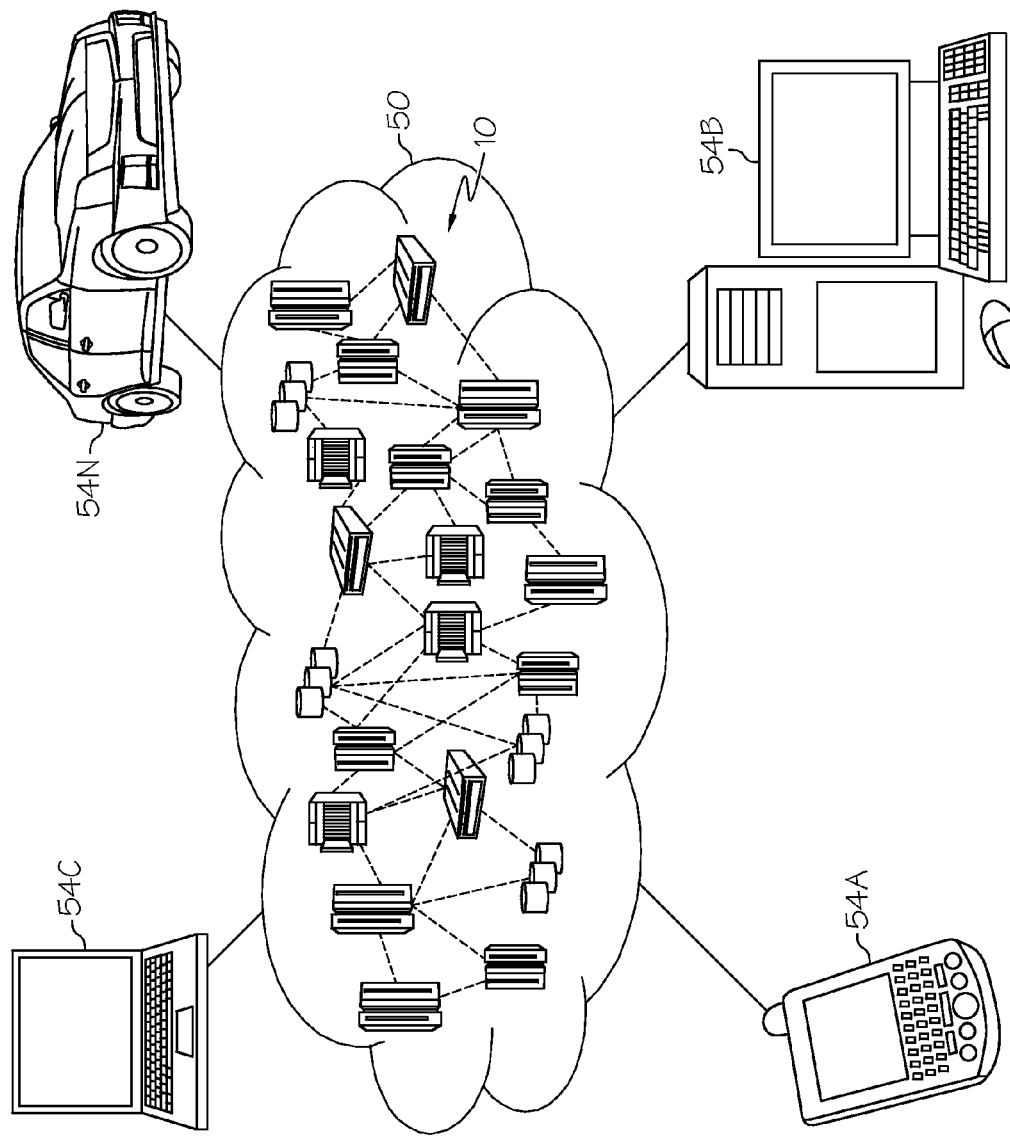
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
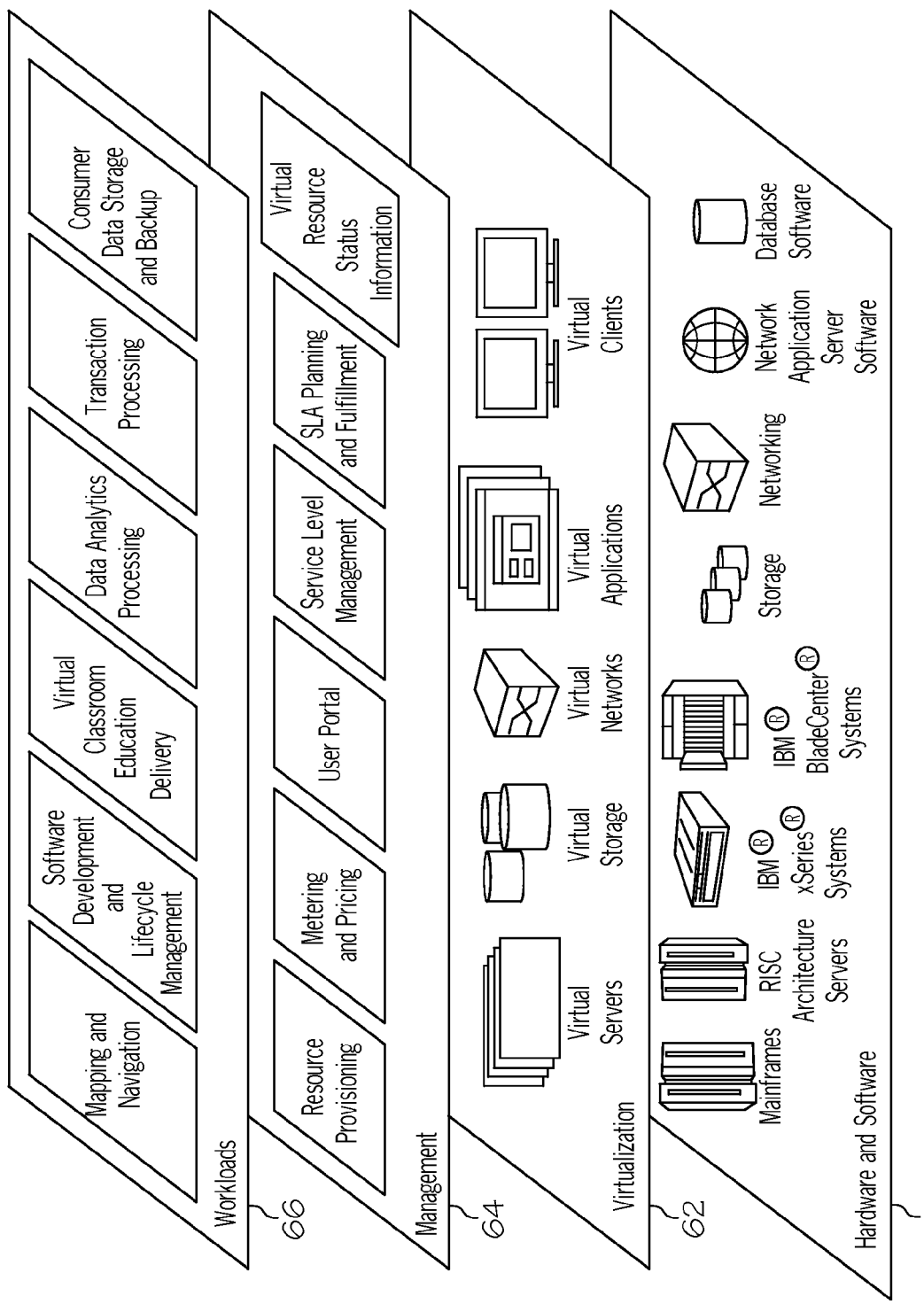
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual resource status information function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual resource stats information functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
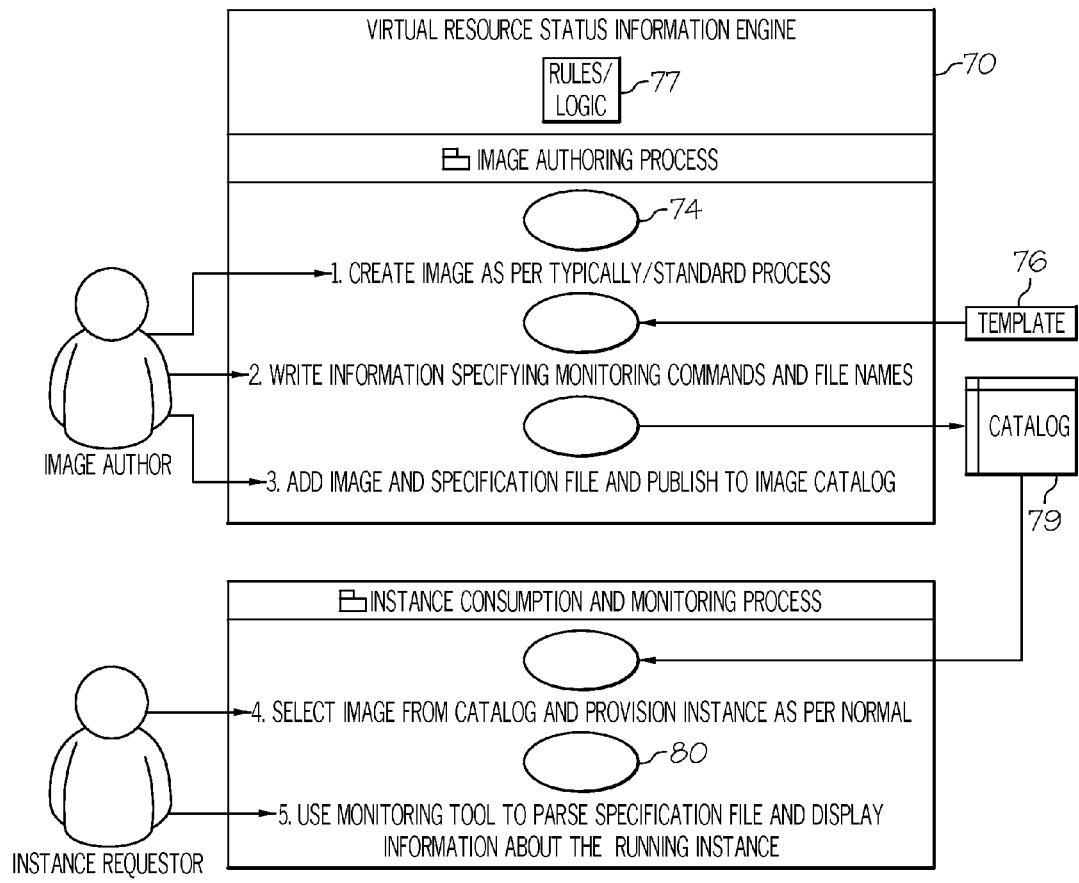
FIG. 4 depicts an illustrative system diagram according to an embodiment of the present invention.

Referring now to FIG. 4, a system diagram depicting an illustrative example of one embodiment of the present invention is shown. As depicted, a virtual resource status information engine (engine 70) is shown. Although not shown in FIG. 4, engine 70 could be positioned within a networked computing environment (e.g., comprising cloud computing environment 50 of FIG. 1). In general, engine 70 can be implemented as program 40 on computer system 12 of FIG. 1 and can implement the functions recited herein as depicted in management layer 64 of FIG. 3. Moreover, engine 70 (in one embodiment) may comprise a rules and/or computational engine that processes a set (at least one) of rules/logic 77 and/or performs a set of computations to provide status information for virtual resources.

Along these lines, system 70 may perform multiple functions similar to a general-purpose computer using rules/logic 77. Specifically, among other functions, engine 70 may: associate a template with an image of a virtual resource, the template comprising information used to determine a status of the image; store the template and the image in a catalog on a computer storage medium in the networked computing environment; receive a request for an instance of the virtual resource; provision the instance based on the image; provide the template with the instance; and/or access the status by executing an application against the information, the application being loaded on a computerized device that utilizes the instance.

ILLUSTRATIVE EXAMPLES

These concepts will be explained further in conjunction with a set of illustrative examples shown and depicted in FIGS. 4-7. It is understood that although the illustrative examples set forth below describe the provisioning of a virtual server, any type of virtual computing resource could be provisioned in accordance with the teachings recited herein.

Example 1

An author/developer of a virtual server image wishes to provide health/operational fitness information about a system (e.g., more than a hypervisor may typically provide about the state of the operating system). The developer may specify a list of commands that can be run that allow a consumer/instance requester to query the status of whether an instance of WebSphere Application Server® (WebSphere®, WebSphere Application Server® and related terms are trademarks of IBM Corporation in the United States and/or other countries) is running (e.g., using a netstat command to determine whether ports are in use). An end user may provision an instance of a server that has this information (e.g., added metadata) and that is able to use a web console to see the detailed information about the health of the WebSphere Application Server® in addition to the state of the associated operating system (e.g., CPU usage, memory consumption, disk usage, etc).

Example 2

A developer of a virtual server based on enterprise server "A" wants to specify a custom file system location of an associated web server. A user may log onto the system and use an extensible markup language (XML) file to specify a file path that is included with the corresponding definition of the image. A command line client (e.g., that is written by the end user) may use this information to trace the logs for problems and alert the client based on any unusual activity (e.g., hypertext transfer protocol (HTTP) error codes that indicate broken links or overwhelming load at certain times of day.

Example 3

A developer of a virtual server specifies information into a configuration file that is packaged with image information in an image catalog. This information may include the location and usage data about a utility that can monitor email server activity over a period of time. A consumer who creates a virtual machine from this image can then use a mobile application or the like that is aware of this information to visualize reports over time about the health of his email server wherever he happens to be. In all of these scenarios, the end user is able to get more value from the virtual cloud instances that he or she already uses. In addition, the image developer can help the customer get the most out of the image he has configured and therefore improve the rate at which his product is adopted. In both cases, this optional, additive information need not change the existing development and consumption processes, as it does not require the addition of new code onto the monitored virtual servers.

Referring once again to FIG. 4, a process flow diagram is shown by which each of these illustrative examples may be addressed in accordance with the embodiments of the present invention:

1. An image developer 72 creates a virtual machine image 74 according to a standard preparation process.
2. Image developer 72 uses a template 76 to expose information (e.g., also referred to herein as "metadata") about the introspection that is available to consumers of a given image that can be instantiated (e.g., in the cloud environment). This can be information such as the name of a process, the port on which the process listens, or any other signature that will notify an end user that it is "healthy" or "operationally fit". In this example, image developer 72 provides a file that exposes commands that can be run to show status information (e.g., disk usage, memory consumption, CPU usage, etc.) along with information such as the name of applicable processes, associated ports, where log files reside (e.g., /var/logs/db), etc.
3. Image developer 72 publishes (e.g., also along with other information about the image 74 to a catalog 79 in a manner that does not impact users who may be unaware of the new information or do not wish to use the information.
4. End users (e.g., collectively shown as instance requester 78) can provision an instance from the specified instance. However, any users who are aware of the additional metadata may load the metadata into their client application, which can be a command line tool, web application, or mobile device. In this case, instance requestor 78 selects the image 74 and provisions an instance in a typical fashion.
5. Leveraging standard remote access protocols such as SSH, Telnet, etc., an end user application can make use of the extended metadata information in order to execute scripts, run commands, and read logs to obtain status information about the instance, restart the process, or further mutate the instance's state. In this case, the user may use a mobile device that can read the information. In such a case, the execution of the scripts, command lines, files, etc., that contain the status information may provide one or more user interfaces visualizing that status information. For example, the user may see charts or the like showing resource usage, stoplights indicating that a database is running or down, and/or a portion of a latest log entry.

Figure 5:
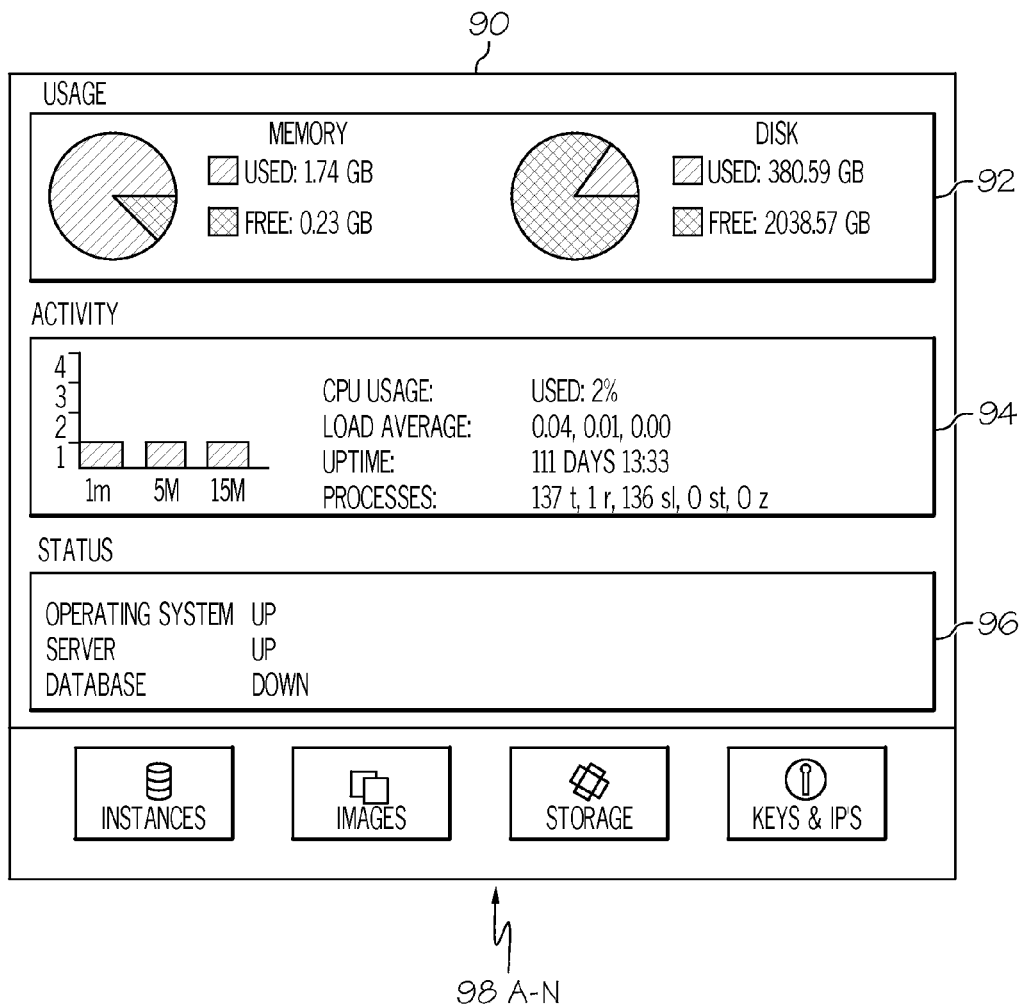
FIG. 5 depicts an illustrative user interface depicting virtual resource status information according to an embodiment of the present invention.

Referring now to FIG. 5, a first user interface 90 generated from FIG. 4 according to the embodiments of the present invention is depicted. In general, user interface 90 is generated when the instance is provisioned. Specifically, an application on the client device that receives the instance and the template may execute the scripts, command lines, files, etc., in the template that result in user interface 90 being generated. As shown, user interface can include various fields 92, 94, and 96 of status information. For example: field 92 depicts charts showing memory and disk usage; field 94 depicts graphs showing CPU usage, load average, runtime, and process information; and field 96 depicts various additional status information such as database status. Further, user interface 90 can include one or more buttons 98A-N for accessing additional functions and/or pieces of information (e.g., instances, images, storage and keys, and IP).

Figure 6:
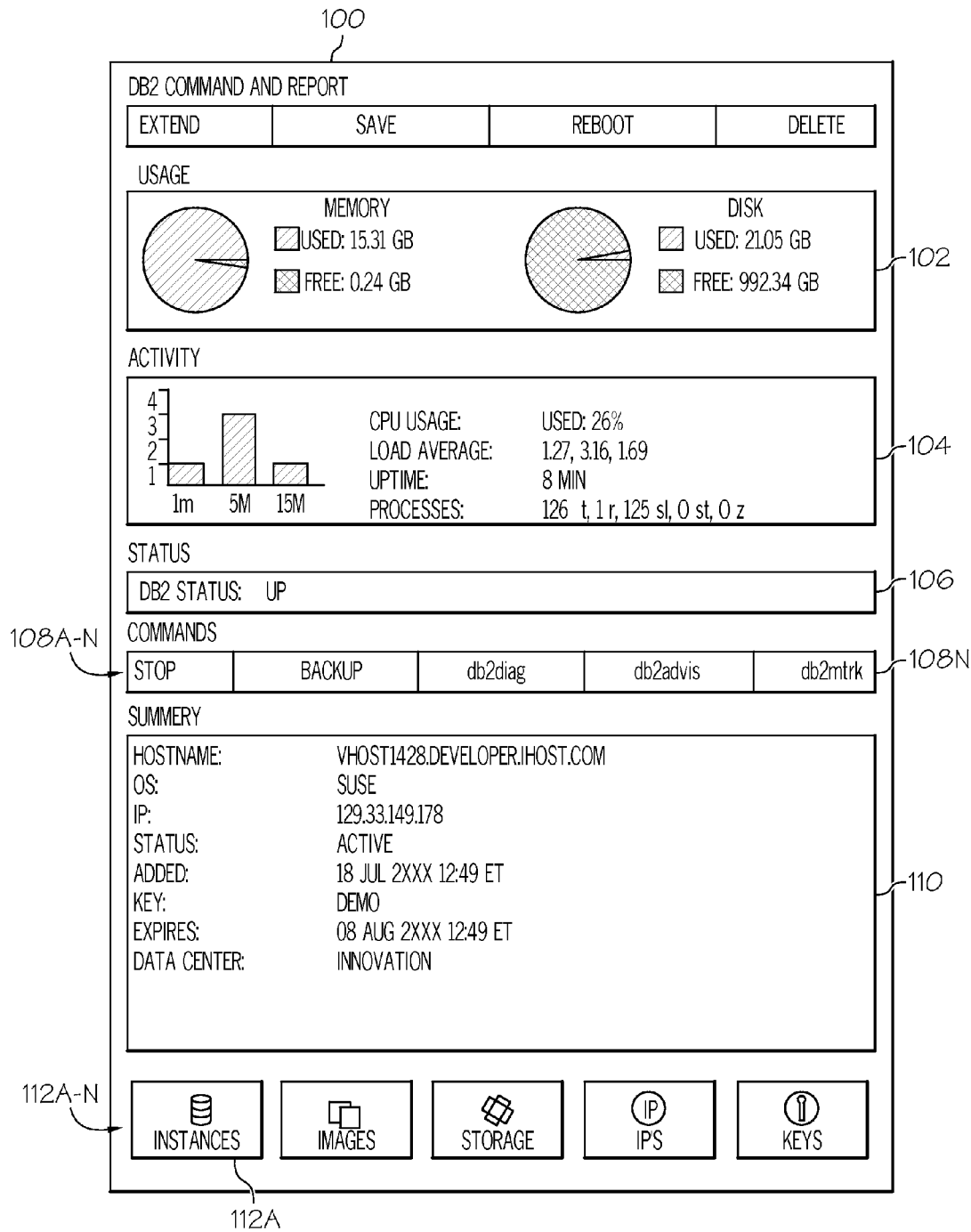
FIG. 6 depicts another illustrative user interface depicting virtual resource status information according to an embodiment of the present invention.

Referring now to FIG. 6, an additional interface 100 is depicted showing potential information and/or functions that can be accessed using one or more of the buttons of interface 100. Similar to interface 90 of FIG. 5, interface 100 comprises various fields 102, 104, and 106 of status information. For example: field 102 depicts charts showing memory and disk usage; field 104 depicts graphs showing CPU usage, load average, runtime, and process information; and field 106 depicts various additional status information such as operating system status, server status, and database status. Further, interface 100 can comprise one or more command buttons 108A-N for accessing additional pieces of information. In the example shown, command button 108N has been selected, which results in a database information field 110 being exposed that includes additional information such as hostname, operating system, internet protocol (IP), date/time added, key, expiration date, and data system identifier. Still further, user interface 100 can include additional buttons 112A-N (e.g., instances, images, storage, IPs, and keys).

Figure 7:
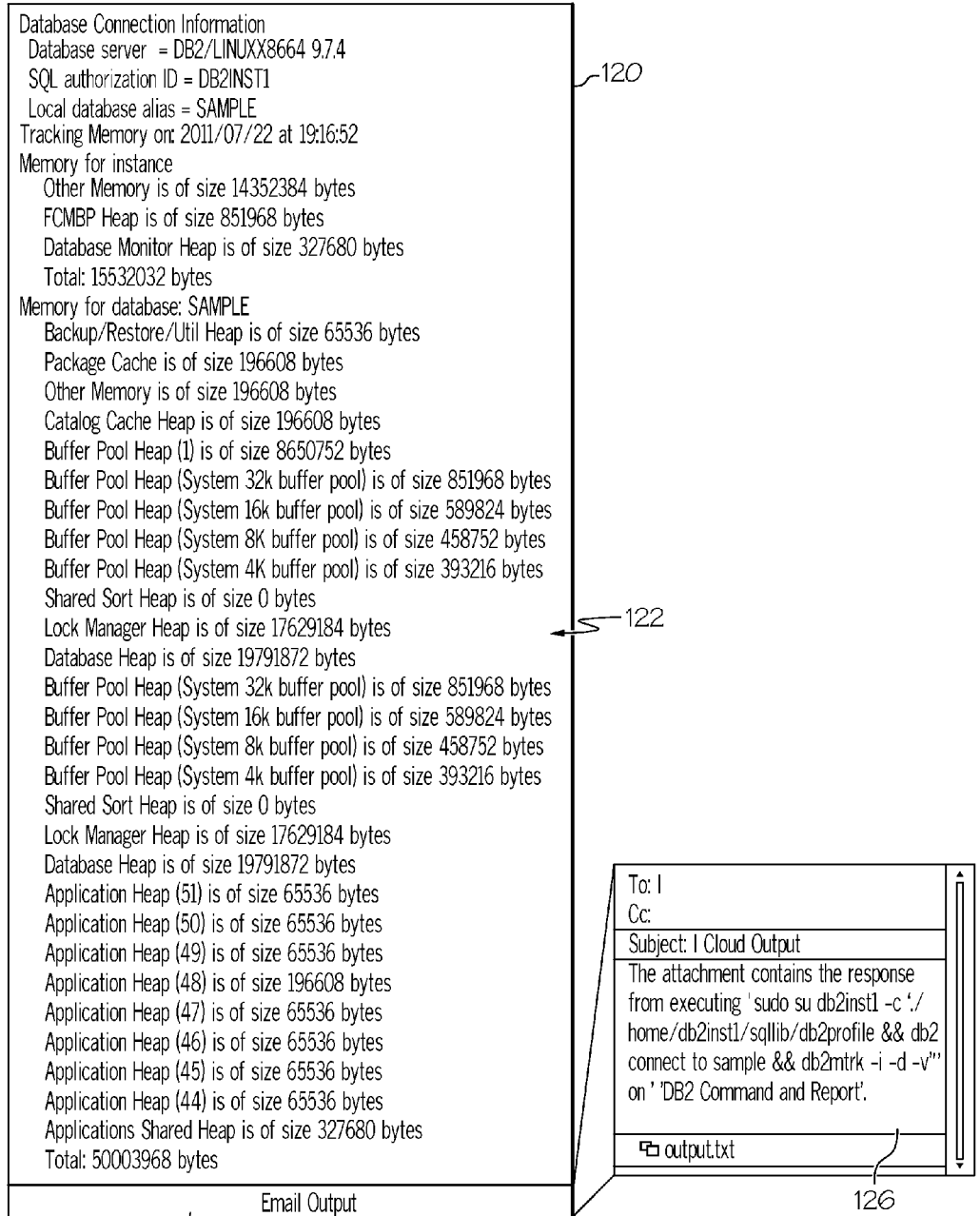
FIG. 7 depicts illustrative status information and corresponding email generated according to an embodiment of the present invention.

Upon selection of instance button 112A (e.g., an "instance" button), an additional interface 120 such as that shown in FIG. 7 will be shown. As depicted, interface 120 comprises a field 122 indicating the status of the database instance. This information can be obtained from log fields, etc. In addition, if a user selected email button 124, an email 126 can automatically be generated (e.g., using scripts in the template) that contains the information in field 122 (or a subset thereof) to a third party.

In addition, the embodiments of the present invention may allow the results from system health requests to perform an action on an underlying resource. For example, in the WebSphere® example, if it is found that the WebSphere® server is down, the provisioning user could set a preference to automatically execute the commands to attempt to restore the WebSphere® server such as executing the startServer.sh command. Similarly, the system may obtain results from system health responses, and alert interested parties (e.g., system administrators, resource owners, management, customer administrators, etc.).

Illustrative Pseudo Code

The below code can be utilized to implement the embodiments of the invention as discussed in the examples set forth above:

```xml
<?xml version="1.0" encoding="UTF-8" ?>
<description>This command and report manifest file is intended for use
    on RHEL 5 images running DB2 Express-C.</description>
  </meta>
  <commands>
  <!--
Runs a generic command with default and/or overridable parameters, a
    return type of text or void, and whether it the client should block
    for a reply
  -->
  <command id="start-instance">
    <label>Start</label>
    <condition>
      <status ref="is-db2-up" value="Down" />
    </condition>
    <execute>
      <shell returns="void" type="asynchronous" command="sudo su
          db2inst1 -c '. /home/db2inst1/sqllib/db2profile && db2start'" />
    </execute>
  </command>
  <command id="stop-instance">
    <label>Stop</label>
    <condition>
      <status ref="is-db2-up" value="Up" />
    </condition>
    <execute>
      <shell returns="void" type="asynchronous" command="sudo su
          db2inst1 -c '. /home/db2inst1/sqllib/db2profile && db2stop'" />
    </execute>
  </command>
  <command id="backup-database">
    <label>Backup</label>
    <condition>
      <status ref="is-db2-up" value="Up" />
    </condition>
    <execute>
      <shell returns="void" type="asynchronous" command="sudo su
          db2inst1 -c '. /home/db2inst1/sqllib/db2profile && db2 backup
          database SAMPLE to /home/db2inst1'" />
    </execute>
  </command>
  <command id="db2diag">
    <label>db2diag</label>
    <condition>
      <status ref="is-db2-up" value="Up" />
    </condition>
    <execute>
      <shell returns="text" type="synchronous" command="sudo su
          db2inst1 -c '. /home/db2inst1/sqllib/db2profile && db2diag -g
          db=SAMPLE,instance=db2inst1'" />
    </execute>
  </command>
  <command id="db2advis">
    <label>db2advis</label>
    <condition>
      <status ref="is-db2-up" value="Up" />
    </condition>
    <execute>
      <shell returns="text" type="synchronous" command="sudo su
          db2inst1 -c '. /home/db2inst1/sqllib/db2profile && db2advis -d
          SAMPLE -n db2inst1 -s \"SELECT * FROM EMP\"'" />
    </execute>
  </command>
  <command id="db2mtrk">
    <label>db2mtrk</label>
    <condition>
      <status ref="is-db2-up" value="Up" />
    </condition>
    <execute>
      <shell returns="text" type="synchronous" command="sudo su
          db2inst1 -c '. /home/db2inst1/sqllib/db2profile && db2 connect
          to sample && db2mtrk -i -d -v'" />
    </execute>
  </command>
  </commands>
  <reports>
  <!--
A simple report, this uses ps/grep to search the process name, netstat
    for ports and returns a boolean
  -->
  <status id="is-db2-up">
    <label>DB2 status</label>
    <process>db2sysc</process>
    <ports>
      <port>50000</port>
    </ports>
  </status>
  </reports>
</custom-command-report-manifest>
```

Figure 8:
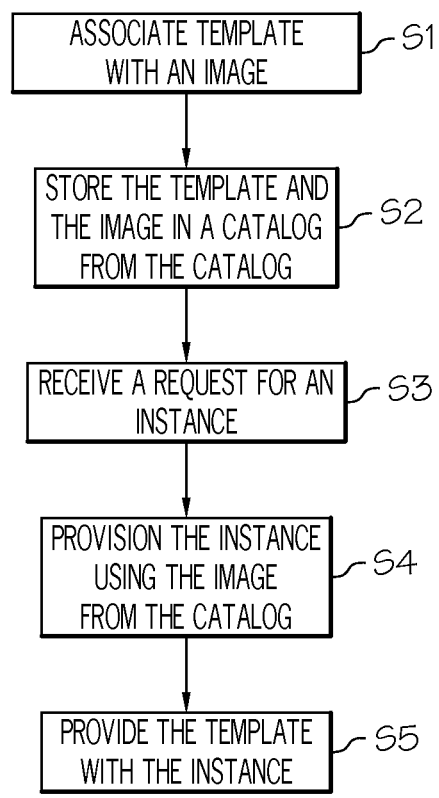
FIG. 8 depicts a method flow diagram according to an embodiment of the present invention.

Referring now to FIG. 8, a method flow diagram according to an embodiment of the present invention is shown. In step S1, a template is associated with an image of a virtual resource. The template typically comprises information used to determine a status of the image (e.g., a set of commands, or a set of files the execution of which yields the status of the image) and may be an extensible markup language (XML) file, a text file, or a binary file. In step S2, the template and the image are stored in a catalog on a computer storage medium in the networked computing environment. In step S3, a request for an instance of the virtual resource is received. In step S4, the instance is provisioned based on the image from the catalog. In step S5, the template is provided with the instance. Once obtained, an application loaded on a computerized/client device (e.g., a mobile device) can be executed against the information/template. This may result in the displaying of a user interface on the computerized device on which the status can be displayed. In any event, the status may pertain to an operational fitness (e.g., available memory, central processing unit (CPU) usage, process information, or port information) of at least one of the following: an operating system associated with the instance, or middleware associated with the instance.

While shown and described herein as a virtual resource status information solution, it is understood that the invention further provides various alternative embodiments. For example, in one embodiment, the invention provides a computer-readable/useable medium that includes computer program code to enable a computer infrastructure to provide virtual resource status information functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide virtual resource status information functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual resource status information. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable 9 the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for providing status information for virtual resource images in a networked computing environment, comprising:

associating a template with an image of a previously created virtual resource, the template being separate from the virtual resource and comprising a set of instructions that gather information regarding a status of the image as the image is executing, the information being gathered independently from other images;

storing the template and the image in a catalog on a computer storage medium in the networked computing environment;

receiving a request for an instance of the virtual resource;

provisioning the instance based on the image;

providing the template with the instance;

generating a user interface via an application that is external to the instance in response to the instance being provisioned, the user interface comprising a visualization of the status of the image generated by executing the set of instructions in the template by the application that gather the information, and accessing the status by executing an application against the information, the application being loaded on a computerized device that utilizes the instance, the execution of the application providing a user interface on the computerized device on which the status can be displayed.

2. The computer-implemented method of claim 1, the information comprising at least one of the following: a set of commands, or a set of files, the execution of which yields the status of the image.

3. The computer-implemented method of claim 1, the status pertaining to an operational fitness of at least one of the following: an operating system associated with the instance, or middleware associated with the instance.

4. The computer-implemented method of claim 1, the status comprising at least one of the following: available memory, central processing unit (CPU) usage, process information, or port information.

5. The computer-implemented method of claim 1, the template comprising at least one of the following, an extensible markup language (XML) file, a text file, or a binary file.

6. The computer-implemented method of claim 1, the networked computing environment comprising a cloud computing environment.

7. A system for providing status information for virtual resource images in a networked computing environment, comprising:

a memory medium comprising instructions;

a bus coupled to the memory medium; and a processor coupled to the bus that when executing the instructions causes the system to:

associate a template with an image of a previously created virtual resource, the template being separate from the virtual resource and comprising a set of instructions that gather information regarding a status of the image as the image is executing, the information being gathered independently from other images;

store the template and the image in a catalog on a computer storage medium in the networked computing environment;

receive a request for an instance of the virtual resource;

provision the instance based on the image;

provide the template with the instance; and generate a user interface via an application that is external to the instance in response to the instance being provisioned, the user interface comprising a visualization of the status of the image generated by executing the set of instructions in the template by the application that gather the information, and access the status by executing an application against the information, the application being loaded on a computerized device that utilizes the instance, the execution of the application providing a user interface on the computerized device on which the status can be displayed.

8. The system of claim 7, the information comprising at least one of the following: a set of commands, or a set of files, the execution of which yields the status of the image.

9. The system of claim 7, the status pertaining to an operational fitness of at least one of the following: an operating system associated with the instance, or middleware associated with the instance.

10. The system of claim 7, the status comprising at least one of the following: available memory, central processing unit (CPU) usage, process information, or port information.

11. The system of claim 7, the template comprising at least one of the following, an extensible markup language (XML) file, a text file, or a binary file.

12. The system of claim 7, the networked computing environment comprising a cloud computing environment.

13. A computer program product for providing status information for virtual resource images in a networked computing environment, the computer program product comprising a computer readable storage device, and program instructions stored on the computer readable storage device, to:

associate a template with an image of a previously created virtual resource, the template being separate from the virtual resource and comprising a set of instructions that gather information regarding a status of the image as the image is executing, the information being gathered independently from other images;

store the template and the image in a catalog on a computer storage medium in the networked computing environment;

receive a request for an instance of the virtual resource;

provision the instance based on the image;

provide the template with the instance; and generate a user interface via an application that is external to the instance in response to the instance being provisioned, the user interface comprising a visualization of the status of the image generated by executing the set of instructions in the template by the application that gather the information, and access the status by executing an application against the information, the application being loaded on a computerized device that utilizes the instance, the execution of the application providing a user interface on the computerized device on which the status can be displayed.

14. The computer program product of claim 13, the information comprising at least one of the following: a set of commands, or a set of files, the execution of which yields the status of the image.

15. The computer program product of claim 13, the status pertaining to an operational fitness of at least one of the following: an operating system associated with the instance, or middleware associated with the instance.

16. The computer program product of claim 13, the status comprising at least one of the following: available memory, central processing unit (CPU) usage, process information, or port information.

17. The computer program product of claim 13, the template comprising at least one of the following, an extensible markup language (XML) file, a text file, or a binary file.

18. The computer program product of claim 13, the networked computing environment comprising a cloud computing environment.

19. A method for deploying a system for providing status information for virtual resource images in a networked computing environment, comprising:

providing a computer infrastructure being operable to:

associate a template with an image of a previously created virtual resource, the template being separate from the virtual resource and comprising a set of instructions that gather information used to determine a status of the image as the image is executing;

store the template and the image in a catalog on a computer storage medium in the networked computing environment;

receive a request for an instance of the virtual resource;

provision the instance based on the image;

provide the template with the instance; and associate a template with an image of a previously created virtual resource, the template being separate from the virtual resource and comprising a set of instructions that gather information regarding a status of the image as the image is executing, the information being gathered independently from other images; and access the status by executing an application against the information, the application being loaded on a computerized device that utilizes the instance, the execution of the application providing a user interface on the computerized device on which the status can be displayed.

* * * * *